(No Model.) 7 Sheets—Sheet 2.

W. G. KENT & H. S. PRICE.
FLUID METER.

No. 491,245. Patented Feb. 7, 1893.

(No Model.) 7 Sheets—Sheet 3.

W. G. KENT & H. S. PRICE.
FLUID METER.

No. 491,245. Patented Feb. 7, 1893.

Witnesses
B. W. Miller
C. M. Brooke

Inventors
Walter G. Kent,
Henry S. Price
By their Attorneys,
Baldwin, Davidson & Wight.

(No Model.) 7 Sheets—Sheet 5.

W. G. KENT & H. S. PRICE.
FLUID METER.

No. 491,245. Patented Feb. 7, 1893.

Witnesses,
B. W. Miller
C. W. Brooke

Inventors
Walter G. Kent,
Henry S. Price,
By their Attorneys,
Baldwin Davidson & Wight (No Model.) 7 Sheets—Sheet 6.

W. G. KENT & H. S. PRICE.
FLUID METER.

No. 491,245. Patented Feb. 7, 1893.

Witnesses
B. W. Miller
C. M. Brooke

Inventors
Walter G. Kent,
Henry S. Price,
By their Attorneys,
Baldwin Davidson & Wight.

THE NORRIS PETERS CO., PHOTO-LITHO., WASHINGTON, D. C.

(No Model.) 7 Sheets—Sheet 7.

W. G. KENT & H. S. PRICE.
FLUID METER.

No. 491,245. Patented Feb. 7, 1893.

Witnesses;
Sidney P. Hollingsworth
B. Washington Miller.

Inventors;
Walter G. Kent,
Henry S. Price
by his attorneys
Baldwin Davidson & Wight

UNITED STATES PATENT OFFICE.

WALTER G. KENT AND HENRY SAMUEL PRICE, OF LONDON, ENGLAND.

FLUID-METER.

SPECIFICATION forming part of Letters Patent No. 491,245, dated February 7, 1893.

Application filed April 30, 1892. Serial No. 431,325. (No model.)

*To all whom it may concern:*

Be it known that we, WALTER GEORGE KENT, manufacturer, and HENRY SAMUEL PRICE, engineer, subjects of the Queen of Great Britain, both residing at 199, 200, and 201 High Holborn, London, in the county of Middlesex, England, have invented a certain new and useful Fluid-Meter, of which the following is a specification.

This invention relates to that class of fluid meter in which the fluid is alternately admitted to and expelled from the ends of two double acting cylinders, the valves of each cylinder being controlled by the piston-rod of the other.

Figure 1:
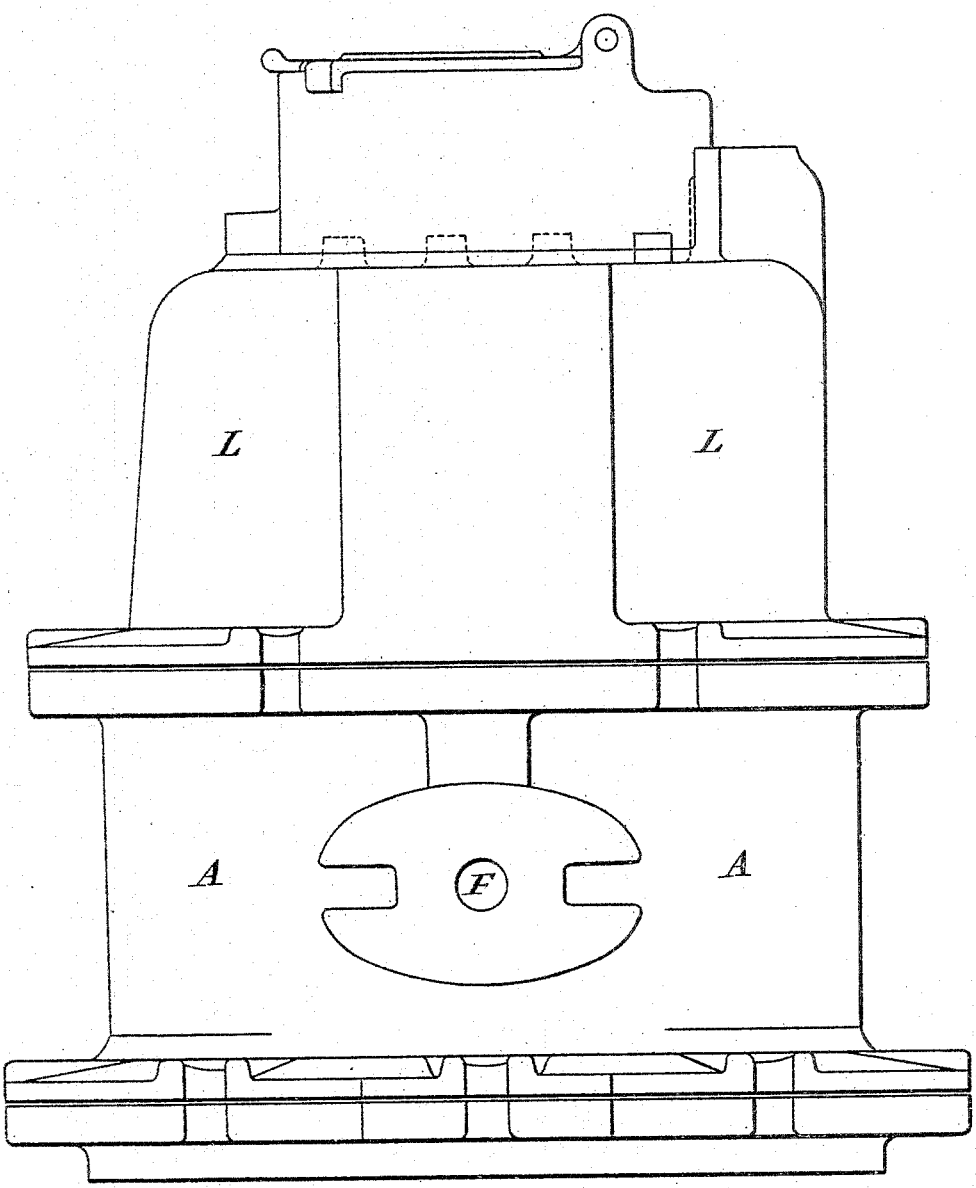
Figure 2:
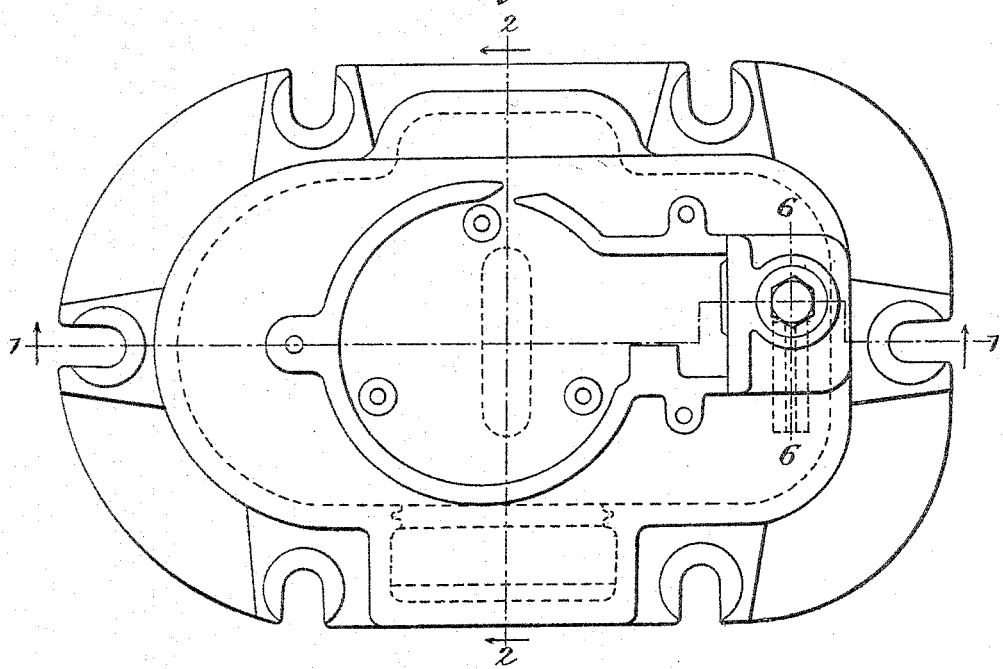
Figure 3:
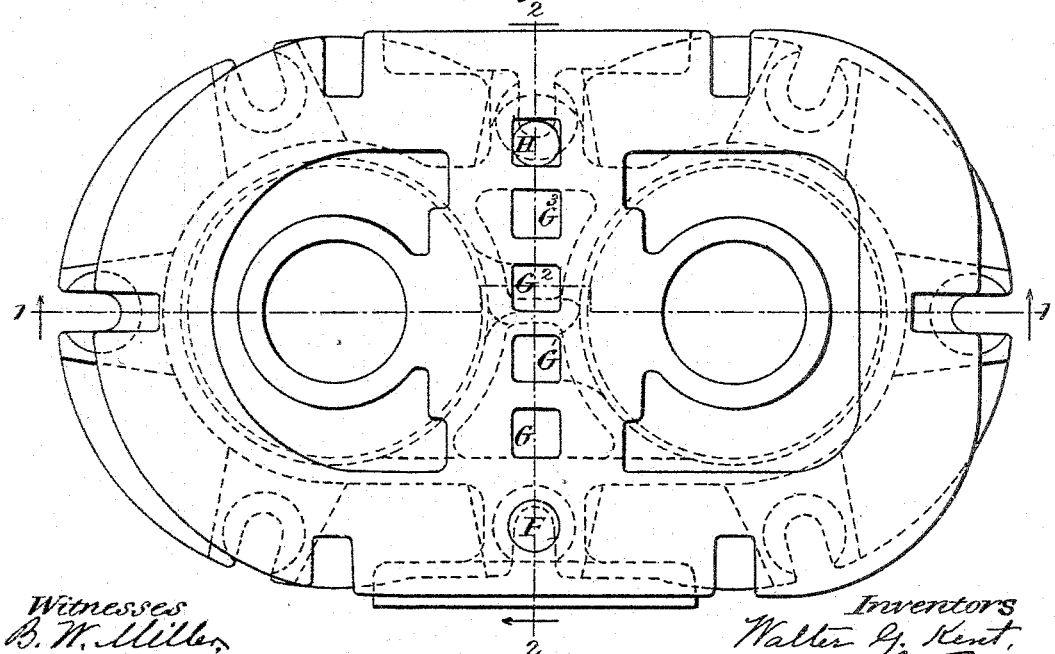
Figure 4:
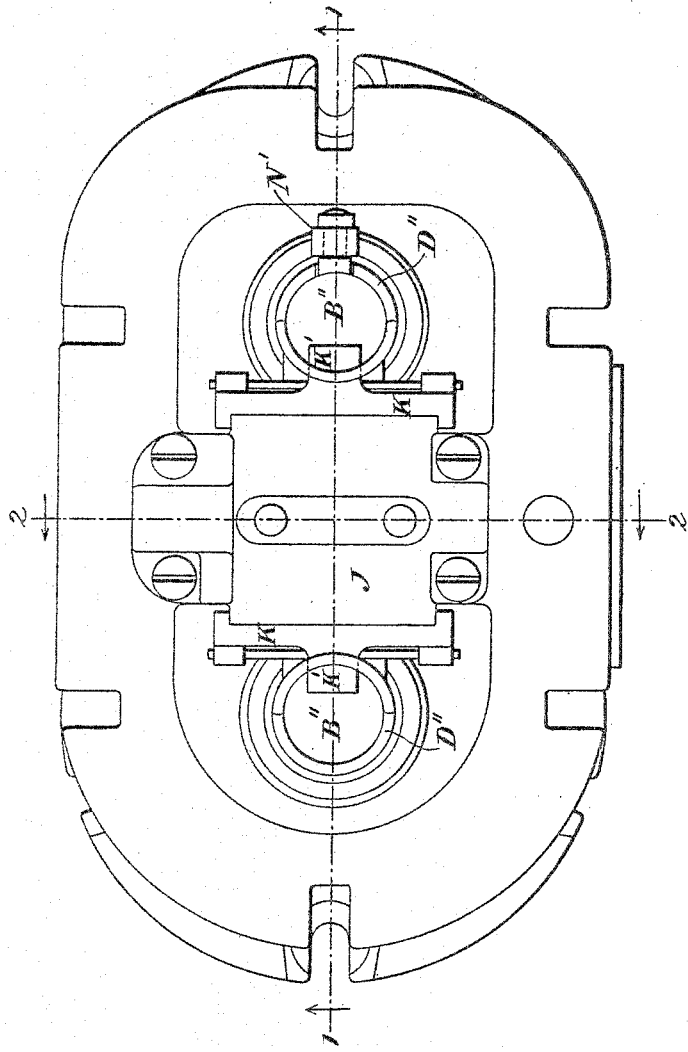
Figure 5:
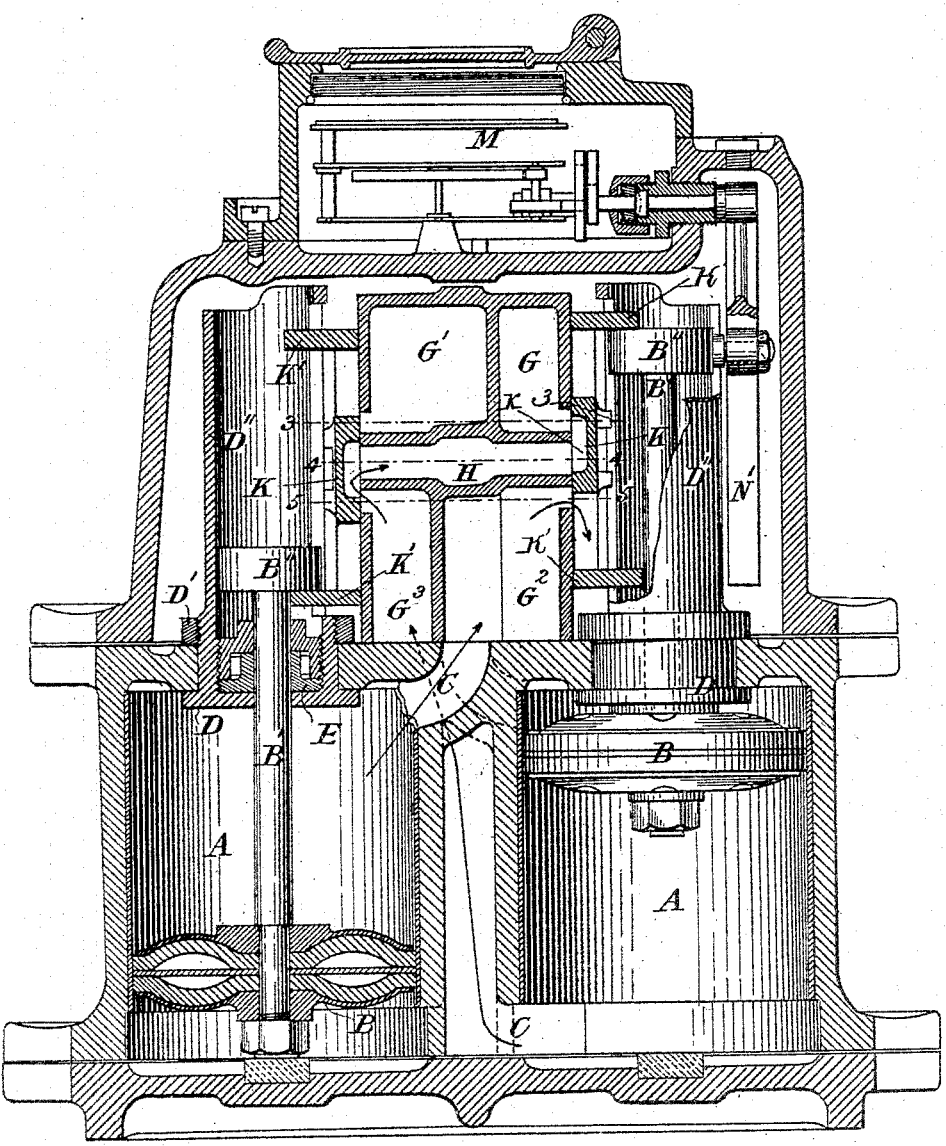
Figure 6:
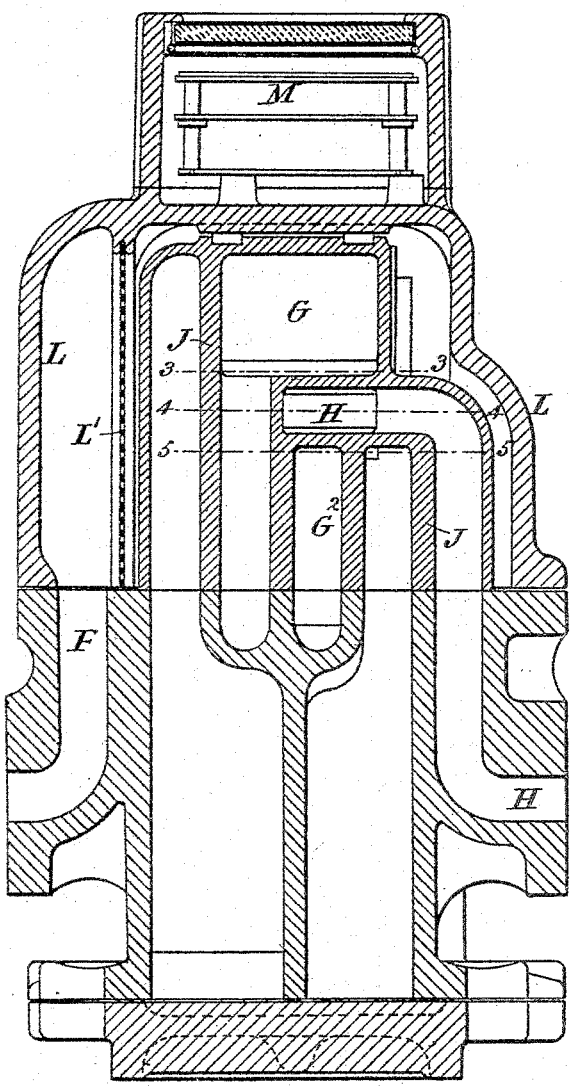
Figure 7:
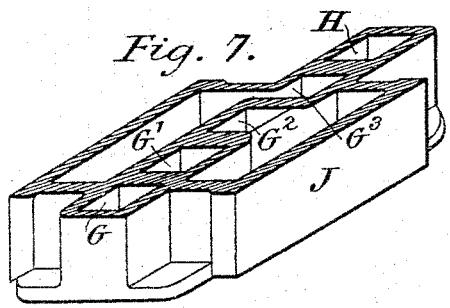
Figure 8:
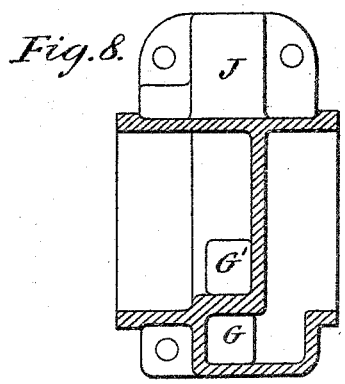
Figure 9:
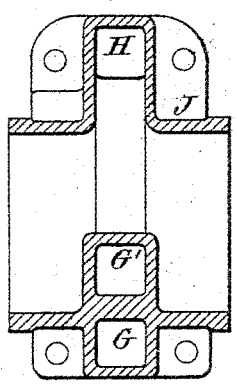
Figure 10:
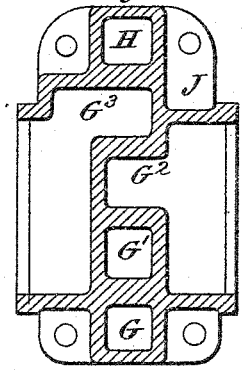
Figure 11:
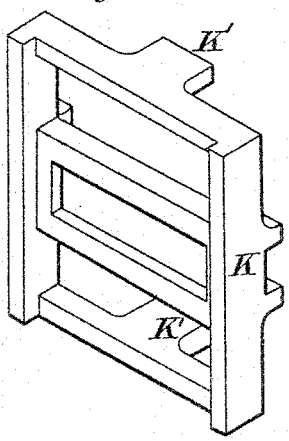
Figure 12:
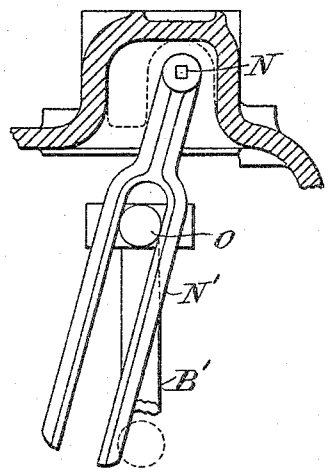
Figure 16:
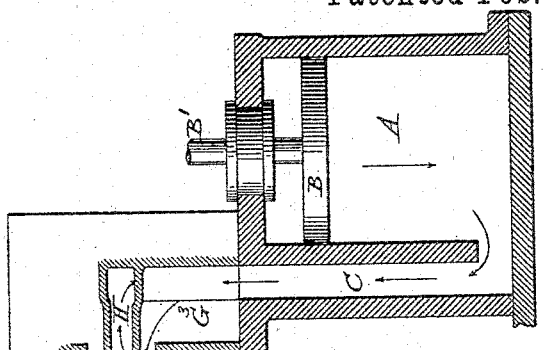
Figure 15:
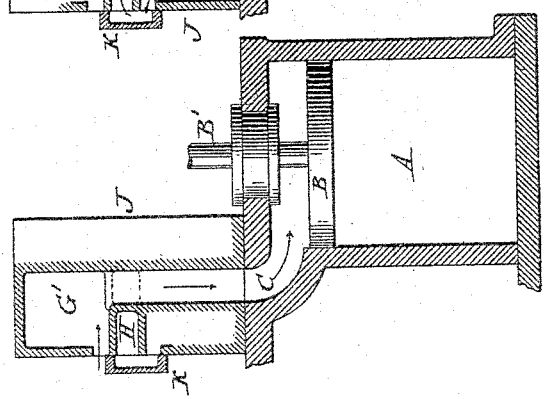
Figure 14:
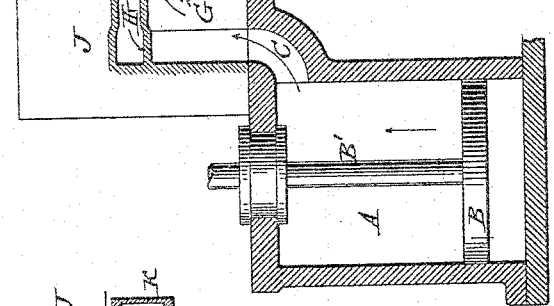
Figure 13:
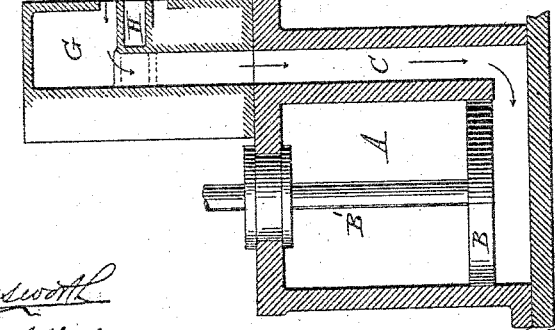

Figure 1 is an elevation and Fig. 2 a plan of the meter. Fig. 3 is a plan with the port block removed. Fig. 4 is a plan with the upper casing removed. Fig. 5 is a vertical section on the line 1. 1. Figs. 2 to 4. Fig. 6 is a vertical section on the line 2. 2 Figs. 2 to 4. Figs. 7 to 10 show the port block, Fig. 7 being a sectional perspective view and Figs. 8 to 10 being respectively horizontal sections on the lines 3. 3; 4. 4; and 5. 5 (Figs. 5 and 6). Fig. 11 is a perspective face view of one of the valves. Fig. 12 is an incomplete local section on the line 6. 6 Fig. 2 showing in elevation the lever for actuating the counting mechanism. Figs. 13 and 14 are sectional diagram views, showing the ports, passages, &c., of the cylinder on one side and their connection with the ports and passages in the port-block; Figs. 15 and 16 are similar views of the opposite sides of the apparatus.

A A are a pair of upright cylinders parallel the one to the other and cast in one piece. The cylinders are provided with pistons B B and with ports C C, at either end for the ingress and egress of the water to be measured. Each piston rod B' passes out at the top of its cylinder by a gland D in which is a leather packing E. The gland is fitted into an aperture in the cylinder end, it is inserted from within the cylinder and is secured by a ring nut D' screwed on to it from the outer side. There is a head B'' upon the piston rod B' and a guide D'' for this head is formed in one piece with the gland. In the upper face of the cylinder casting and between the cylinders there is a row of apertures which are the open ends or mouths of the various passages which the cylinder casting contains. F is the inlet for the water. G is in connection with the bottom of left-hand cylinder Figs. 1 to 5. G' is in connection with the top of the right hand cylinder. $G^2$ is in connection with the top of the left hand cylinder. $G^3$ is in connection with the bottom of the right hand cylinder, and H is in connection with the outlet. Upon the top of the cylinder casting and over these apertures there is a block J with corresponding apertures on its underside, but the inlet F does not pass through the block. This block is called the port block and is shown separately in Figs. 7 to 10. The passages in it bear the same letters as the corresponding passages in the cylinder casting of which they form continuations.

On opposite sides of the block J valve faces are formed parallel to the piston rods and upon each valve face a "D" valve K works. This block is cast of white metal the port faces being of brass which is placed in the mold and held in position during casting. The valve has horns K' and the head of the piston rod as it comes to the ends of its stroke strikes one or other of the horns and moves the valve. The piston rod belonging to one cylinder thus controls the valve belonging to the other cylinder. The valve face in each case has three ports one in connection with the under side of the piston, another with the upper side and between the two an exhaust or egress port.

The mechanism on the top of the valve casting is inclosed in a casing L the interior space being divided into two parts by a perforated partition L' which forms a strainer. The inlet passage F admits water to the compartment on one side of the strainer and in the compartment on the other side of the strainer the valves work. The valves allow the water to pass out from this compartment into the cylinders sometimes on the upper and sometimes on the lower sides of the pistons. The water returns from the cylinders to the interior of the "D" valve K and from thence it passes to the outlet H.

On the top of the casing L is a chamber M containing a counter of any ordinary construction and worked by a ratchet and pawl. This mechanism forms no part of the invention and is not shown in detail in the drawings. The axis N of the pawl lever passes by a stuffing box into the casing L and it carries a pendent arm N' slotted longitudinally to receive a bowl O carried on the head of one of the piston rods. As the axis of the pendent arm is not in the line along which the bowl travels the lever receives a rocking movement through an arc sufficiently large to give the requisite travel to the pawl which drives the counter.

The course taken by the water through the ports, passages, &c., in the two cylinders is clearly illustrated in Figs. 13, 14, 15, and 16, the direction of the flow being indicated by arrows.

What we claim is:—

1. In a fluid meter, the combination of a cylinder casting having in it two cylinders, pistons working in the cylinders, piston rods fixed to the pistons and passing out at the top of the cylinders, passages in the cylinder casting leading from its upper surface to both ends of each of the two cylinders, a block on the top of the casting containing passages leading from its underside (in continuation of the passages in the casting) to valve faces on opposite sides of it and valves on the valve faces worked by the piston rods.

2. In a fluid meter, the combination of a cylinder casting having in it two cylinders, pistons working in the cylinder, piston rods fixed to the pistons and passing out through the tops of the cylinders, passages in the cylinder casting leading from its upper surface to both ends of each of the two cylinders and to an inlet and outlet respectively, a block on the top of the casting containing passages leading from its underside (in continuation of all the passages in the casting except the inlet passage) to valve faces on opposite sides of it, valves on the valve faces worked by the piston rods and a casing into which the inlet leads surrounding the block and the valve.

3. The combination of the casting provided with two cylinders A A, and having the passages C, leading from its upper surface to both ends of the two cylinders, a port block J, above the casting provided with passages leading from its underside and communicating with and forming continuations of the passages C, in the casting, valve faces on opsite sides of the port block, valves operating thereon, pistons working in the cylinders, and connections between the pistons and the valves.

4. The combination of the cylinder casting having the two cylinders A A therein, pistons working in the cylinders, piston rods fixed to the pistons and passing out through the tops thereof, passages C, in the cylinder leading from its upper surface to both ends of each of the two cylinders, a port block on the top of the casting provided with passages leading from its underside (in continuation of the passages in the casting), valve faces on opposite sides of the port block, valves working in the valve faces, connections between the valves and the piston rods and a casing surrounding the port block and the valves above the cylinders.

5. The combination of a cylinder A, a piston B, working therein, a piston rod B' extending out through the top of the cylinder, a gland passing out from the inside of the cylinder through an opening in one end thereof, a guide D'', for the piston, formed in one piece with the gland, and a nut on the outside of the cylinder for securing the gland and guide in place.

6. The combination of a cylinder having one end formed integrally with its sides, a piston working in the cylinder, a piston rod secured thereto, a gland passing out from the inside of the cylinder through one end thereof, a guide D'' formed integrally with the gland, a head B'', secured to the piston rod and working in the guide D'', and a nut on the outside of the cylinder for securing the gland and guide in place.

7. The combination of the cylinder casting provided with the two cylinders A A, and having formed with it the passages C, extending to both ends of each cylinder, the port block J, above the cylinder casting, and having the passages G G' G² G³, and the discharge passage H, the vertically moving valves K, having the arms K', pistons working in the cylinders piston rods formed with heads engaging with the arms K', and a casing inclosing the port block and valves.

WALTER G. KENT.
HENRY SAMUEL PRICE.

Witnesses:
F. C. CARPENTER,
24 *Southampton Bgs., W. C.*
T. F. BARNES,
17 *Gracechurch Street, London, E. C.*